United States Patent [19]
Frohwein

[11] Patent Number: 6,101,694
[45] Date of Patent: *Aug. 15, 2000

[54] METHOD FOR REMOVING USED ELASTOMERIC COVERS FROM ROLLERS AND A DEVICE FOR PERFORMING SAME

[75] Inventor: Axel Frohwein, Köln, Germany

[73] Assignee: Felix Bottcher GmbH & Co., Cologne, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,432

[22] Filed: May 8, 1997

[30] Foreign Application Priority Data

May 9, 1996 [DE] Germany ................ 196 18 613

[51] Int. Cl.⁷ ..................................... B23C 3/04
[52] U.S. Cl. .................. 29/27 C; 29/895.1; 409/132; 409/166; 409/199; 492/56
[58] Field of Search ................... 409/132, 137, 409/165, 166, 199; 82/1.11, 70.2, 83, 131; 29/27 C, 28, 33.5, 33.52, 895.1, 564; 492/56

[56] References Cited

U.S. PATENT DOCUMENTS

| | | |
|---|---|---|
| 1,718,793 | 6/1929 | Malke . |
| 1,971,428 | 8/1934 | Riordan . |
| 2,011,585 | 8/1935 | Lippincott . |
| 2,061,581 | 11/1936 | Lippincott ................... 82/83 |
| 2,073,895 | 3/1937 | Kauffman, II ........... 409/131 |
| 2,200,544 | 5/1940 | Drummond .............. 409/132 |
| 2,208,572 | 7/1940 | Drummond .............. 409/165 |
| 2,265,643 | 12/1941 | Heath . |
| 2,398,763 | 4/1946 | Bagne . |
| 3,442,166 | 5/1969 | Pope et al. . |
| 3,811,347 | 5/1974 | Heckhausen ................... 83/1 |
| 4,538,945 | 9/1985 | Godecke et al. ......... 409/166 |
| 4,626,150 | 12/1986 | Dapiran et al. .......... 409/199 |
| 4,844,668 | 7/1989 | Pettersson ............... 407/116 |
| 5,039,259 | 8/1991 | Duncan ..................... 407/53 |
| 5,145,297 | 9/1992 | McGrath, Jr. ........... 409/132 |
| 5,443,411 | 8/1995 | Rouyer et al. . |
| 5,660,092 | 8/1997 | Scholz et al. ............ 409/132 |

FOREIGN PATENT DOCUMENTS

| | | |
|---|---|---|
| 0 625 406 | 11/1994 | European Pat. Off. . |
| 1031187 | 5/1958 | Germany ................. 409/165 |
| 1905737 | 12/1964 | Germany . |
| 1479623 | 9/1969 | Germany . |
| 2248853 | 4/1974 | Germany . |
| 2719674 | 12/1978 | Germany ................. 409/132 |
| 29 44 199 | 5/1981 | Germany . |
| 4412143 | 10/1995 | Germany . |
| 1255302 | 9/1986 | U.S.S.R. ................. 409/199 |

*Primary Examiner*—Daniel W. Howell
*Attorney, Agent, or Firm*—Jacobson, Price, Holman & Stern PLLC

[57] ABSTRACT

The method for removing used elastomeric covers from rollers is performed by approaching a rotating cutter head having a number of cutting tools mounted on an indexable insert holder from one end of the cover of the rotating roller to close to the roller core, and moving said cutter head along the rotating roller to the other end of the cover, the circumferential velocities of the cutting tools being from 15 to 70 m/s, preferably from 40 to 50 m/s. For elastomers of up to about 90 Shore A, annular cutting tools are used.

13 Claims, 3 Drawing Sheets

METHOD FOR REMOVING USED ELASTOMERIC COVERS FROM ROLLERS AND A DEVICE FOR PERFORMING SAME

The present invention pertains to a method for removing used elastomeric covers from rollers and a device for performing the method.

To date, used elastomeric covers of rollers have been removed by either burning or turning them off. Burning off is accompanied by emissions of harmful substances. Due to the heat evolved in burning off, it is necessary to drill into the cores and to pin them together. Nevertheless, overheatings and thus warping of the cores may occur. Also, burning out of the necks may occur. The waste rubber hoses remaining after the burning off can be disposed of only with very high costs. Altogether, burning off requires relatively high levels of energy.

Turning off used elastomeric covers from rollers generates flowing chips which can, be disposed of only with difficulty. As previous experience has shown, the long flowing chips increase the danger of accident. In addition, when used elastomeric covers are removed by turning them off, it cannot be avoided that the uppermost layer of the core is always also removed towards the end. Thus, this method always involves some diametrical wear.

DE-OS 22 48 853 describes an operational method for preparing bald motor vehicle tires for retreading in which the residual rubber is chipped from the tire with a rotating cutter, the cutting edge of the cutter preferably being grooved. The grooves in the cutting edge are preferably ground in a conical shape. Such cutters are preferably employed in a milling head. This generates a scaly surface which will undergo a particularly intimate bonding with the raw material applied for retreading.

U.S. Pat. No. 2,265,643 describes a cutting tool for rasping the surface of rubber tires which are to be retreaded. This tool is intended to create a smooth surface on which the retreading will then take place.

U.S. Pat. No. 1,971,428 describes a tool by means of which to remove excess rubber from swollen print rolls. This also removes but relatively thin layers of the rubber cover to create a smooth surface again.

U.S. Pat. No. 1,718,793 describes a device for roughening rubber surfaces which will subsequently be bonded together to form the inner tube of automobile tires. The method and device for preparing a tube according to DE-OS 14 79 623 serve the same purpose. A thin layer is removed to obtain a rougher surface.

U.S. Pat. No. 2,398,763 describes a cutting device for soft rubber, cotton and felt having a loose texture or fibrous composition. This rotating cutting machine has a special design of the cutting teeth. FIGS. 6 and 7 show the preparation of an elongated notch or the removal of the outer layer of a roller to give a smaller diameter. The cutting is done by means of a saw blade ground in a very particular and complicated way which will become blunt quickly and can be reground only with a very high expenditure. This device is not suitable for removing the relatively hard, but elastic elastomer layers of used rollers. Therefore, in practice, the used elastomer covers of rollers have been removed by either burning or turning them off.

Both turning off and burning off are time-consuming and therefore involve relatively high costs.

It has been the object of the invention to improve the method for removing used elastomeric covers from rollers in that it would become more economic, safe, environmental-friendly and ultimately more simple and rapid to perform.

This object has now been achieved by approaching a rotating cutter head having a number of cutting tools mounted on an indexable insert holder from one end of the cover of the rotating roller to close to the roller core, and said cutter head being moved along the rotating roller to the other end of the cover, the circumferential velocities of the cutting tools being from 15 to 70 m/s, preferably from 40 to 50 m/s.

In the case that the elastomers have a Shore A hardness of more than 90, the cutting tools are equipped with turning tools. In the case that the elastomers have a Shore A hardness of up to about 90, annular cutting tools have proven excellently successful. In both method variants, small particles of approximately equal size are produced rather than chips. When turning tools are used, chip-like particles will form. At the high cutting velocities used according to the invention, the used elastomeric covers no longer behave like elastomers, but like well cuttable materials, such as wood or plastics. To date, such behavior has been observed and employed only in the surface treatment of elastomers according to EP-A1-0 625 406. In this method, however, only very thin layers of the surface are removed. It was not to be anticipated that with a correspondingly increased supply of energy and correspondingly different tools, such as annular cutting tools or turning tools, the entire used elastomeric cover could be removed from rollers in one working cycle, even without damaging or wearing the roller core.

In order to surely avoid diametrical wear of the core and to extend the service life of the cutting tools at the rotating cutter head, the latter is approached only to close to the roller core. Thus, a thin residual layer of the used elastomeric covers remains on the roller core. This is preferably removed with one or a number of juxtaposed rotating circular disk brushes with plaited steel wires. This circular disk brush is moved along the rotating roller in a lagging position with respect to, but simultaneously with the rotating cutter head. The remaining remnants of the elastomeric covers are removed in the form of dust. The roller core, however, is not damaged or partially removed, as in turning off.

Another advantage of the method according to the invention is that the particles formed from the elastomeric covers by cutting and the dust formed in the subsequent brushing can be sucked off. These are easily stored, shipped and disposed-of particles which may optionally be even subjected to reuse in the form of ground rubber scrap.

Another advantage of the method according to the invention is that the rotating cutter head, after having completed the working of one roller, can proceed to work the next roller in the opposite direction. Thus, it is not necessary to move the rotating cutter head and the rotating circular disk brush back to their initial positions. Rather, it is only necessary to displace the position of the rotating circular disk brush with respect to the rotating cutter head so that when working the next roller in the opposite direction, the rotating circular disk brush will again be moved along the next rotating roller in a lagging position with respect to, but simultaneously with the rotating cutter head.

The device for performing the method according to the invention consists of:

a) a machine tool for clamping and rotating the rollers having a support for advancing and adjusting the cutting tool;

b) a rotating cutter head with an indexable insert holder and a drive of its own for said cutter head.

The indexable insert holder is equipped with either turning tools or annular cutting tools, depending on the hardness of the used elastomeric cover. Since the bulk of the rollers are equipped with elastomeric covers of up to about 90 Shore A, annular cutting tools are predominantly employed. Since most of the elastomeric covers have thicknesses of only up to 25 mm, annular cutting tools can be employed according to the invention having diameters of 50 mm. With such annular cutting tools, cover thicknesses of up to 25 mm can be removed in one working cycle. The rotating cutter head produces circumferential velocities of from 15 to 70 m/s, preferably from 40 to 50 m/s. At such high cutting velocities, the used elastomeric covers behave like nonelastomeric, but well cuttable materials, such as wood and well cuttable plastics, for example. With elastomeric covers of more than about 90 Shore A, the annular cutting tools can no longer be employed, so that usual turning tools must be employed. Indexable insert holder can be equipped in such a way in principle that the turning tools can be employed in both working directions. Thus, in this procedure too, it is possible to work one roller on the way there and the next roller on the way back.

Usual indexable insert holders have at least two, but mostly more cutting edges. Preferably, indexable insert holders which can accommodate four cutting tools are employed according to the invention.

Removing the remnants of the elastomeric covers remaining on the roller core is preferably performed with one or a number of juxtaposed rotating circular brushes with plaited steel wires. For this purpose, the device according to the invention additionally comprises c) another support for advancing and adjusting a rotating circular disk brush with a drive of its own.

These brushes too are preferably designed to work with circumferential velocities of from 15 to 70 m/s, preferably from 40 to 50 m/s. Commercial circular disk brushes are not wide enough for removing the remnants of the remaining elastomeric covers from the roller core with the same working speed as the rotating cutter head. Therefore, a number of such brushes are preferably mounted in juxtaposition to yield a width of activity of from 1 to 2 cm.

Further, it has been established that efficiency and service life of aid circular disk brushes can be substantially improved by the plaits of the steel wires being conglutinated with an elastic plastic material. Polyurethanes, hot-melt adhesives and thermo-plastic block copolymers have proven particular useful. On one hand, such conglutination with an elastic plastic material increases the stiffness of the plaited steel wires and hence increases the aggressiveness of the brush, on the other hand, the plait retains some residual elasticity so that the roller core is not damaged by the steel brush, as could happen with too short and too stiff steel wires. These plaits of the steel wires conglutinated with an elastic plastic material and circular disk brushes produced therefrom are the subject matter of the German Utlity Model 296 08 399.2.

One typical and preferred embodiment of the device according to the invention is further illustrated in the accompanying figures.

Figure 1:
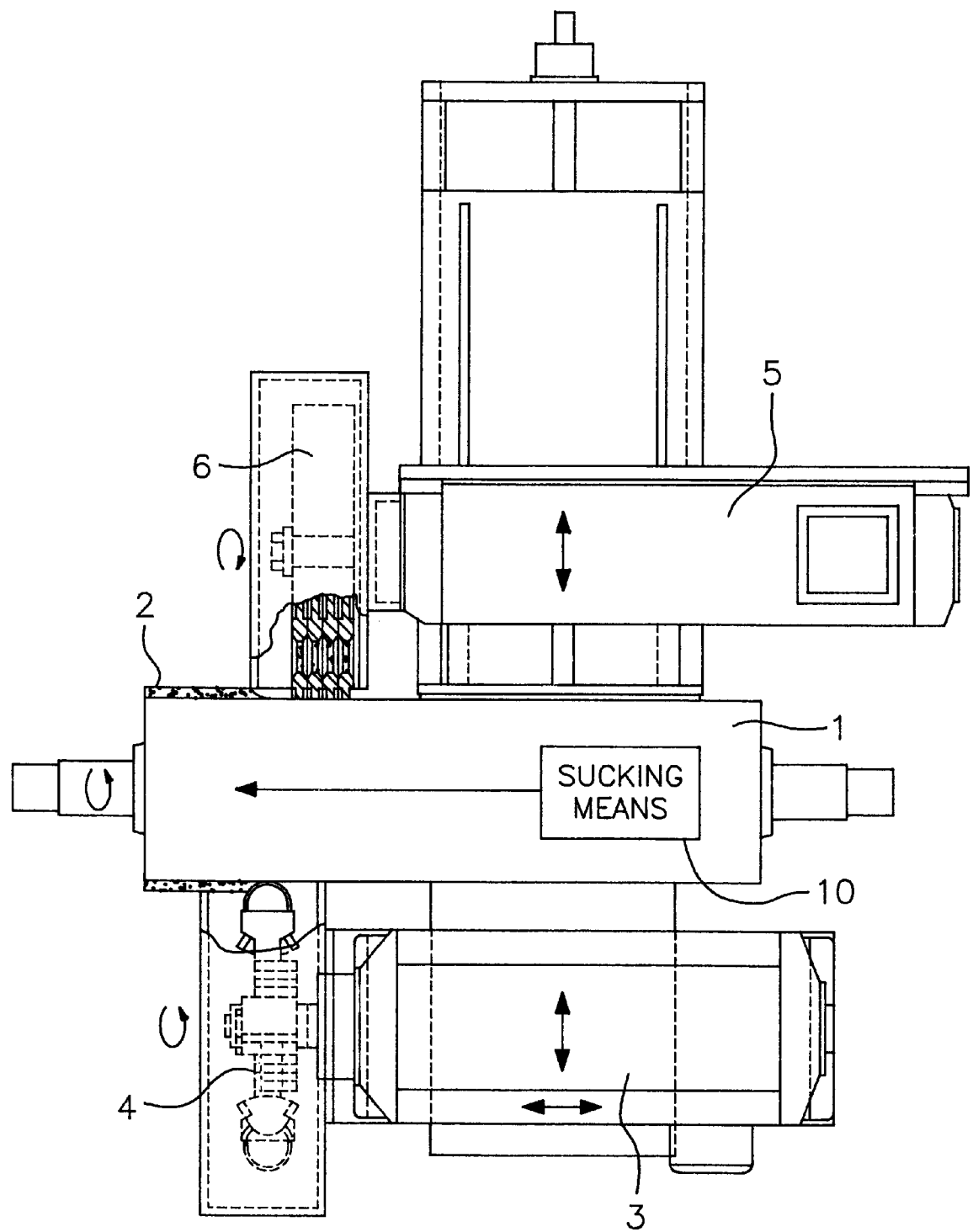
FIG. 1 shows a preferred design of the device according to the invention in a top plan view.
Figure 2:
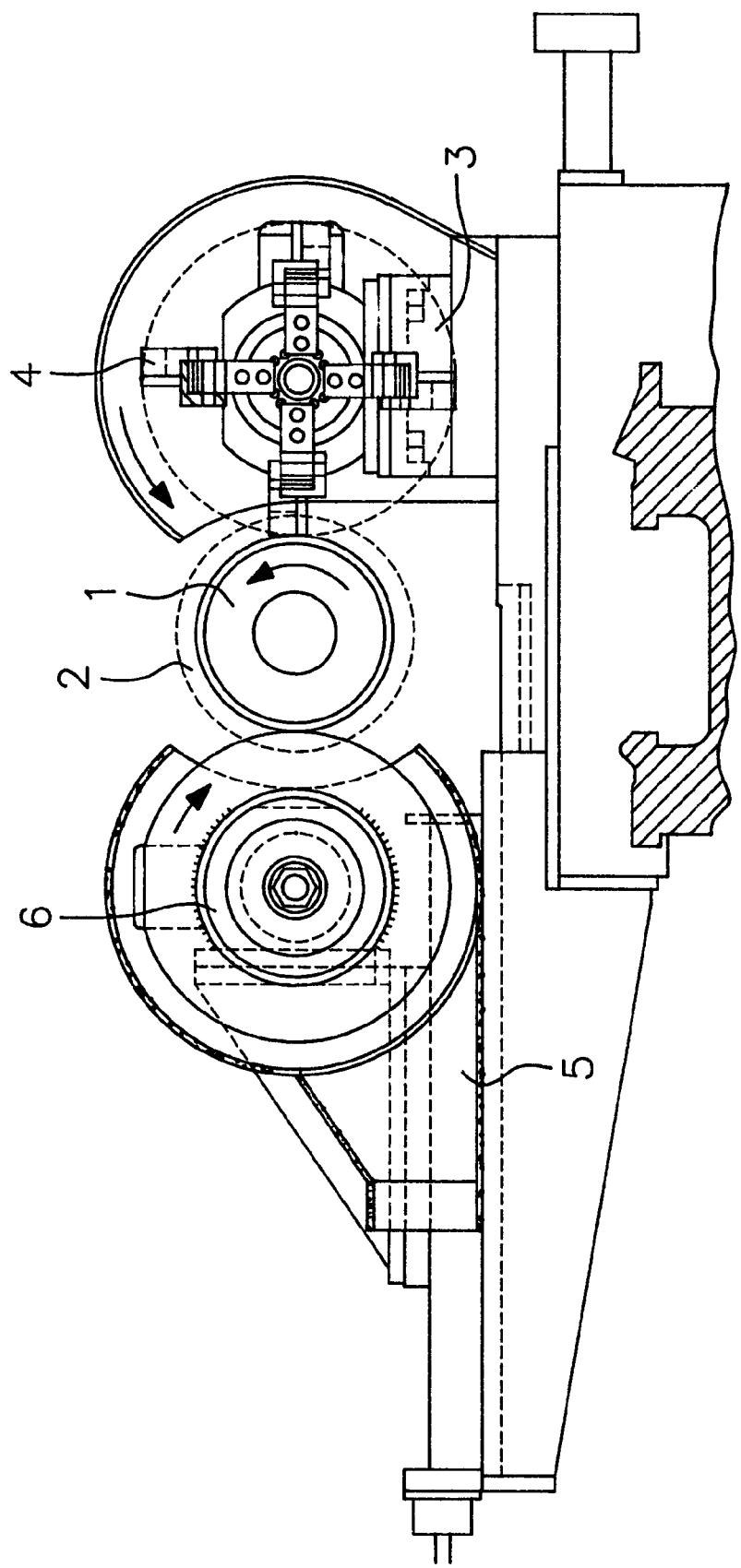
FIG. 2 shows a cross-section through this device.
Figure 3:
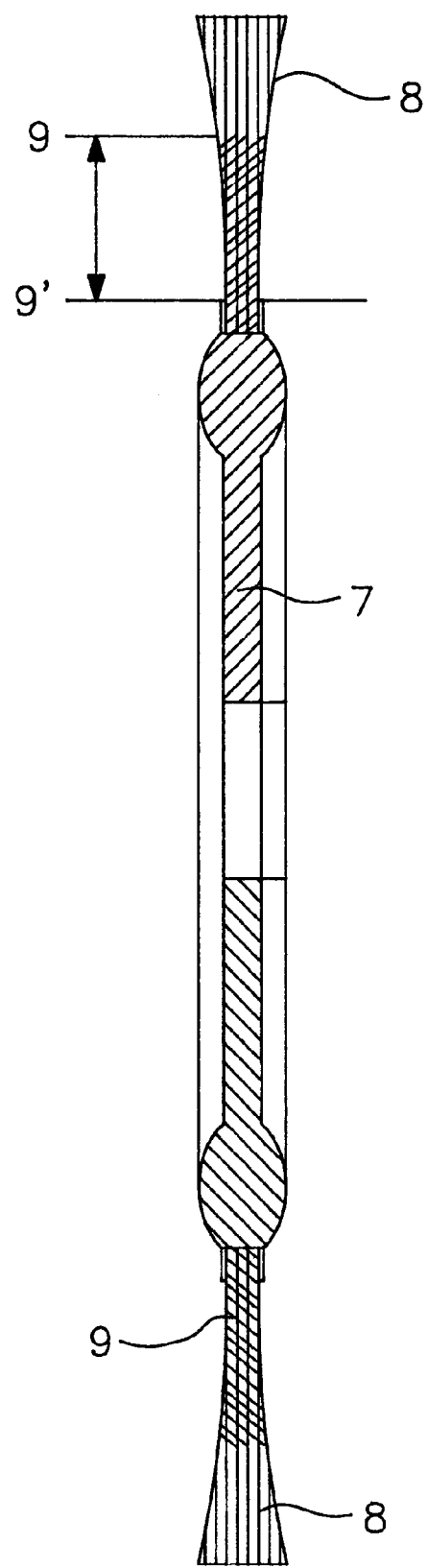
FIG. 3 shows a section through a circular disk brush.

In the figures, 1 means the roller core;
2 means the used elastomeric cover on the roller which is to be removed;
3 means the support for the cutting tool;
4 means a rotating cutter head with an indexable insert holder;
5 means a support for a rotating circular disk brush;
6 means a circular disk brush;
7 means the disk of the circular disk brush;
8 means plaited steel wires;
9 means a region of the plaited steel wires which is conglutinated with an elastic plastic material;
10 sucking means.

What is claimed is:

1. A method for removing entire used elastomeric covers from rollers, characterized in that a rotating cutter head having cutting tools mounted on an indexable insert holder is advanced, at one end of opposing ends of an elastomeric cover of a rotating roller, diametrically, from the cover to a position external to a roller core, and said cutter head is moved along the rotating roller to the opposing end of the cover, circumferential velocities of the cutting tools being from 15 to 70 m/s.

2. A method for removing a used elastomeric cover from a roller, comprising the steps, whereby, a rotating cutter head having cutting tools mounted on an indexable insert holder is advanced, at one end of opposing ends of an elastomeric cover of a rotating roller, diametrically, from the cover to a position external to a roller core, said cutter head is moved along the rotating roller in a direction toward the opposing end of the cover, circumferential velocities of the cutting tools being from 15 to 70 m/s, leaving remnants of the elastomeric cover on the roller core, and the remnants of the elastomeric cover remaining on the roller core are removed by moving along the rotating roller, in a lagging position with respect to, but simultaneously with, the rotating cutter head, a rotating circular disk brush, or juxtaposed circular disk brushes, said brush or brushes having plaited steel wires.

3. The method according to claim 2, characterized in that the circumferential velocities of the cutting tools are 40 to 50 m/s.

4. The method according to claim 2, characterized in that the elastomeric cover has a hardness of more than about 90 Shore A, and the cutting tools are turning tools.

5. The method according to claim 2, characterized in that the elastomeric cover has a hardness of up to about 90 Shore A, and the cutting tools are annular cutting tools.

6. The method according to claim 2, further comprising sucking off from the roller core particles of the elastomeric cover left by the cutting head and dust of the elastomeric cover left by a brushes.

7. The method according to claim 2, further comprising, after removing the remnants of the elastomeric cover from the roller core, longitudinally reversing the respective positions of the cutting head and the circular disk brush or brushes, and repeating the method steps, to remove an elastomeric cover from another rotating roll, but in a direction opposite the direction in which the cover was removed from the first rotating roller.

8. A device for removing an entire used elastomeric cover from a roller comprising:

a) a machine tool for clamping and rotating the roller having a support for advancing and adjusting a cutting tool and another support for advancing and adjusting a circular disk brush;

b) a cutter head with an indexable insert holder and a drive for rotating said cutter head;

c) a circular disk brush having plaited steel wires with a drive for rotating said brush.

9. The device according to claim 8 additionally comprising d) a sucking means for removing particles and dust from the roller.

10. The device according to claim 8, characterized in that said circular disk brush with said drive are longitudinally displaceable.

11. The device according to claim 8, characterized in that said circular disk brush comprises juxtaposed disks having plaited steel wires.

12. The device according to claim 11, characterized in that the plaits of said steel wires are conglutinated with an elastic plastic material.

13. The device according to claim 8, characterized in that the plaits of said steel wires are conglutinated with an elastic plastic material.

* * * * *

UNITED STATES PATENT AND TRADEMARK OFFICE
CERTIFICATE OF CORRECTION

PATENT NO. : 6,101,694
DATED : August 15, 2000
INVENTOR(S) : Axel Frohwein

It is certified that error appears in the above-identified patent and that said Letters Patent is hereby corrected as shown below:

Abstract,
Line 8, insert -- having a hardness -- after elastomers;

Column 2,
Line 12, delete "Shore A";
Line 13, insert after 90 -- Shore A --;
Line 14, delete "Shore A";
Line 15, insert after 90 -- Shore A --;

Column 3,
Line 9, after covers insert -- having a hardness --;
Line 21, after covers insert -- having a hardness --;
Line 52, change "elastic plastic" to -- visco-elastic --;
Line 55, change "elastic plastic" to -- visco elastic --;
Line 62, change "Utlity" to -- Utility --.

Signed and Sealed this

Ninth Day of October, 2001

*Attest:*

NICHOLAS P. GODICI
*Attesting Officer*   Acting Director of the United States Patent and Trademark Office